United States Patent
Vilsmeier et al.

(10) Patent No.: US 12,475,594 B2
(45) Date of Patent: Nov. 18, 2025

(54) IMAGE-BASED INSTRUMENT IDENTIFICATION AND TRACKING

(71) Applicant: Brainlab AG, Munich (DE)

(72) Inventors: Stefan Vilsmeier, Munich (DE); Matthias Eimer, Munich (DE)

(73) Assignee: Brainlab AG, Munich (DE)

( * ) Notice: Subject to any disclaimer, the term of this patent is extended or adjusted under 35 U.S.C. 154(b) by 331 days.

(21) Appl. No.: 17/783,308

(22) PCT Filed: Dec. 11, 2019

(86) PCT No.: PCT/EP2019/084638
§ 371 (c)(1),
(2) Date: Jun. 8, 2022

(87) PCT Pub. No.: WO2021/115583
PCT Pub. Date: Jun. 17, 2021

(65) Prior Publication Data
US 2023/0027274 A1    Jan. 26, 2023

(51) Int. Cl.
*G06T 7/73* (2017.01)
*G06V 20/64* (2022.01)
*G06V 20/70* (2022.01)

(52) U.S. Cl.
CPC ............... *G06T 7/74* (2017.01); *G06V 20/64* (2022.01); *G06V 20/70* (2022.01);
(Continued)

(58) Field of Classification Search
CPC ............ G06T 7/74; G06T 2207/30004; G06T 2210/12; G06T 7/70; G06T 7/0008;
(Continued)

(56) References Cited

U.S. PATENT DOCUMENTS

| 2010/0081921 A1 | 4/2010 | Urban | |
|---|---|---|---|
| 2013/0113929 A1* | 5/2013 | DeLand | A61B 90/90 382/103 |

(Continued)

OTHER PUBLICATIONS

International Search Report, corresponding to application serial No. PCT/EP2019/084638, filed Dec. 11, 2019, 15 pages.
Bouget, David, et al.; Vision-based and marker-less surgical tool detection and tracking: a review of the literature, Sep. 13, 2016, 22 pages.
Kranzfelder, Michael, et al.; Real-time instrument detection in minimally invasive surgery using radiofrequency identification technology, Jul. 3, 2013, 7 pages.
(Continued)

*Primary Examiner* — Sumati Lefkowitz
*Assistant Examiner* — Aaron Joseph Sorrin
(74) *Attorney, Agent, or Firm* — Tucker Ellis LLP

(57) ABSTRACT

Disclosed is a computer-implemented method of transmitting identification information of a medical instrument. The method encompasses comparing a digital image of an instrument tray and an instrument to a digital image of just the instrument tray to determine the identity of the instrument. A characteristic geometry such as its envelope is assigned to the instrument, and a characteristic quantity of the envelope such as its aspect ratio may be used to identify the instrument. Based on determining, from the image of the instrument and the instrument tray, the relative position between those two entities, the method determines whether the instrument has been taken from the instrument tray, and accordingly instructs a medical computing system about this determination. The medical computing system may then determine whether the correct instrument has been taken from the instrument has been taken from the instrument tray, for example by comparison with medical procedure planning data.

20 Claims, 2 Drawing Sheets

(52) U.S. Cl.
CPC .................... *G06T 2207/30004* (2013.01);
*G06T 2210/12* (2013.01); *G06V 2201/034* (2022.01)

(58) Field of Classification Search
CPC .... G06T 2210/41; G06V 20/64; G06V 20/70; G06V 2201/034; G06V 10/25; G06V 2201/03; A61B 90/90; A61B 50/33; A61B 90/96; A61B 2034/2065; A61B 2034/2068; A61B 2034/2055; A61B 34/10; A61B 34/20; A61B 90/94; A61B 2034/102; A61B 34/30
See application file for complete search history.

(56) References Cited

U.S. PATENT DOCUMENTS

| | | | |
|---|---|---|---|
| 2017/0312035 A1* | 11/2017 | May ..................... | A61B 90/90 |
| 2019/0362839 A1* | 11/2019 | Quintini ................. | G16H 30/20 |
| 2020/0120308 A1* | 4/2020 | McMillan .............. | G06F 3/017 |

OTHER PUBLICATIONS

Instrument Tracking—Keydot; Keysurgical Brochure, 2 pages.
Kranzfelder, Michael, et al.; Feasibility of opto-electronic surgical instrument identification, https://www.tandfonline.com; Oct. 9, 2019, 2 pages.

* cited by examiner

IMAGE-BASED INSTRUMENT IDENTIFICATION AND TRACKING

RELATED APPLICATION DATA

This application is a National Phase application of International Application No. PCT/EP2019/084638, filed Dec. 11, 2019, the contents of which are incorporated herein by reference.

FIELD OF THE INVENTION

The present invention relates to a computer-implemented method of transmitting identification information of a medical instrument, a corresponding computer program, a computer-readable storage medium storing such a program and a computer for executing the program, as well as a medical system comprising an electronic data storage device and the aforementioned computer.

TECHNICAL BACKGROUND

The present invention has the object of providing a method for checking correct application of a medical instrument.

The present invention can be used for navigation procedures e.g. in connection with a system for surgical navigation or surgical augmented reality or a digital O.R. system such as Kick® or Curve® or Buzz®, all products of Brainlab AG.

Aspects of the present invention, examples and exemplary steps and their embodiments are disclosed in the following. Different exemplary features of the invention can be combined in accordance with the invention wherever technically expedient and feasible.

Exemplary Short Description of the Invention

In the following, a short description of the specific features of the present invention is given which shall not be understood to limit the invention only to the features or a combination of the features described in this section.

The disclosed method encompasses comparing a digital image of an instrument tray and an instrument to a digital image of just the instrument tray to determine the identity of the instrument. A characteristic geometry such as its envelope is assigned to the instrument, and a characteristic quantity of the envelope such as its aspect ratio may be used to identify the instrument. Based on determining, from the image of the instrument and the instrument tray, the relative position between those two entities, the method determines whether the instrument has been taken from the instrument tray, and accordingly instructs a medical computing system about this determination. The medical computing system may then determine whether the correct instrument has been taken from the instrument has been taken from the instrument tray, for example by comparison with medical procedure planning data.

General Description of the Invention

In this section, a description of the general features of the present invention is given for example by referring to possible embodiments of the invention.

In general, the invention reaches the aforementioned object by providing, in a first aspect, a computer-implemented medical method of transmitting identification information of a medical instrument. The method comprises executing, on at least one processor of at least one computer (for example at least one computer being part of a navigation system, or for example being part of a digital operating room system, integrating video acquisition devices and other medical devices in the operating room, or being part of an augmented reality system comprising a head-mounted display), the following exemplary steps which are executed by the at least one processor.

In a (for example first) exemplary step, initial state image data is acquired, by a computer and from a camera, which describes an image of an instrument tray in an initial state. For example, the camera is configured to take images in the human-visible wavelength range. In this example, the initial state image data and the instrument state image data are image data showing images in the human-visible wavelength range. For example, the camera is at least one of a video camera or a camera included in an augmented reality viewing device. In another example, the camera is for example a 3D camera such as a time-of-flight camera, which is configured to take images in a wavelength range not visible to humans, for example the infrared wavelength range. In the initial state, the instrument tray is for example empty, i.e. no instrument is present on the instrument tray. For example, the instrument tray is free of any instrument in the initial state and the visual appearance of the instrument tray is such that it allows any instrument placed on the instrument tray to be identified from a corresponding digital image.

In a (for example second) exemplary step, instrument state image data is acquired, by the computer and from the camera, which describes an image of an instrument and the instrument tray, the instrument being located on the instrument tray, specifically with physical contact with the surface of the instrument tray. Thus, an instrument state of the instrument tray can be defined in which an instrument is located on the instrument tray.

In a (for example third) exemplary step, instrument envelope data is determined based on the initial state image data and the instrument state image data, wherein the instrument envelope data describes the position of an envelope around the image representation of the instrument in the instrument state image data relative to a position of the instrument tray. For example, the instrument envelope data is determined by determining a difference between the image of the instrument tray in the initial state and the image of an instrument and the instrument tray. For example, this is performed by a pixel-wise subtraction of the images. The images may be pre-processed individually e.g. for changing hue, saturation, colour, brightness or contrast, e.g. bringing it into a greyscale or black-and-white colour space, or e.g. changing the resolution. The pre-processing parameters are for example different for each image. Before subtraction, the images can be aligned using e.g. common landmarks. After subtraction, the difference image can undergo a post-processing such as applying a brightness threshold to all pixels. Pixels with a brightness below threshold may be removed. The envelop can be determined by finding the smallest, e.g. rectangular box or circle enclosing all pixels or e.g. at least a certain percentage, e.g. at least 90 percent of the pixels. For example, the envelope around the image representation of the instrument is defined as a generic shape which is for example independent of the shape of the instrument, for example as a bounding box. For example, the envelope around the image representation of the instrument is defined as an envelope having a predetermined distance around the circumference of the image representation of the instrument.

The position of the envelope is defined for example relative to the position of the instrument tray. The image signature of the instrument, i.e. its envelope or its characteristic quantity such as its aspect ratio, is for example stored and can then be used by the medical computing system as a template for making suggestions for user-initiated labelling of image representations of further instruments or for identifying the instrument again when it is placed back onto the instrument tray.

In a (for example fourth) exemplary step, instrument identity data is acquired and assigned to the instrument envelope data based on user input. For example, the user instructs the computer, for example by using a graphical user interface, to assign a name or other identifier to the image representation of the instrument in the instrument state data. This process may also be called labelling the instrument. For example, an image signature of the instrument, for example an aspect ratio of the envelope around the image representation of the instrument, is extracted from the instrument envelope data. In one example, the instrument identity data is determined further based on the image signature. In one example, the instrument is video-tracked from the point in time of labelling it so that the computer can learn its image appearance from different perspectives.

In a (for example fifth) exemplary step, instrument usage data is determined based on the instrument envelope data, wherein the instrument usage data describes that the envelope around the image representation of the instrument has attained a predetermined position relative to the position of the instrument tray. If the predetermined position indicates a predetermined positional difference between the instrument tray, for example the surface of the instrument tray, a position of the instrument corresponding to the predetermined position indicates that the instrument has been taken from the instrument tray and for example has been used, specifically in comparison to the instrument state of the instrument tray.

In a (for example sixth) exemplary step, the computer is caused, based on the instrument usage data, to transmit the instrument identity data to a further computer which is part of a medical computing system. For example, the medical computing system is a medical navigation system for navigating a medical procedure, for example for tracking the position of the instrument.

In an example of the method according to the first aspect, the method comprises a step in which instrument position data is determined based on the instrument envelope data, wherein the instrument position data describes the position of the instrument relative to the position of the instrument tray. In one variant of this example, the method comprises a step in which the instrument identity data is acquired further based on the instrument position data.

In a further exemplary step of the method according to the first aspect, infrared image data is acquired which describes an infrared image including an image representation of the instrument tray.

In an even further example of the method according to the first aspect, the method comprises a step in which the image described by the instrument state image data comprises an image representation of an optical code, for example a barcode or quick response (QR) code, disposed on the instrument, wherein the information content of the optical code is extracted from the image described by the instrument state image data and wherein the instrument identity data is determined further based on the information content of the optical code.

In a second aspect, the invention is directed to a computer program comprising instructions which, when the program is executed by at least one computer, causes the at least one computer to carry out method according to the first aspect. The invention may alternatively or additionally relate to a (physical, for example electrical, for example technically generated) signal wave, for example a digital signal wave, such as an electromagnetic carrier wave carrying information which represents the program, for example the aforementioned program, which for example comprises code means which are adapted to perform any or all of the steps of the method according to the first aspect. The signal wave is in one example a data carrier signal carrying the aforementioned computer program. A computer program stored on a disc is a data file, and when the file is read out and transmitted it becomes a data stream for example in the form of a (physical, for example electrical, for example technically generated) signal. The signal can be implemented as the signal wave, for example as the electromagnetic carrier wave which is described herein. For example, the signal, for example the signal wave is constituted to be transmitted via a computer network, for example LAN, WLAN, WAN, mobile network, for example the internet. For example, the signal, for example the signal wave, is constituted to be transmitted by optic or acoustic data transmission. The invention according to the second aspect therefore may alternatively or additionally relate to a data stream representative of the aforementioned program, i.e. comprising the program.

In a third aspect, the invention is directed to a computer-readable storage medium on which the program according to the second aspect is stored. The program storage medium is for example non-transitory.

In a fourth aspect, the invention is directed to at least one computer (for example, a computer), comprising at least one processor (for example, a processor), wherein the program according to the second aspect is executed by the processor, or wherein the at least one computer comprises the computer-readable storage medium according to the third aspect.

In a fifth aspect, the invention is directed to a medical system, comprising:
a) the at least one computer according to the fourth aspect;
b) a camera for generating the initial state image data and the instrument state image data at least one electronic data storage device storing at least the . . . data; and
c) a medical computing system comprising a further computer, wherein the at least one computer is operably coupled to
   the camera for acquiring, from the camera, electronic signals corresponding to the initial state image data and the instrument state image data, and
   the further computer for transmitting the instrument identity data to the further computer.

Alternatively or additionally, the invention according to the fifth aspect is directed to a for example non-transitory computer-readable program storage medium storing a program for causing the computer according to the fourth aspect to execute the data processing steps of the method according to the first aspect.

For example, the invention does not involve or in particular comprise or encompass an invasive step which would represent a substantial physical interference with the body requiring professional medical expertise to be carried out and entailing a substantial health risk even when carried out with the required professional care and expertise.

More particularly, the invention does not involve or in particular comprise or encompass any surgical or therapeutic activity. The invention is instead directed as applicable to identifying a medical instrument and/or its position from image data. For this reason alone, no surgical or therapeutic activity and in particular no surgical or therapeutic step is necessitated or implied by carrying out the invention.

The present invention also relates to the use of the system according to the fifth aspect for conducting a medical procedure, wherein the use comprises execution of the steps of the method according to the first aspect for transmitting the identification information of the medical instrument to the further computer.

Definitions

In this section, definitions for specific terminology used in this disclosure are offered which also form part of the present disclosure.

The method in accordance with the invention is for example a computer implemented method. For example, all the steps or merely some of the steps (i.e. less than the total number of steps) of the method in accordance with the invention can be executed by a computer (for example, at least one computer). An embodiment of the computer implemented method is a use of the computer for performing a data processing method. An embodiment of the computer implemented method is a method concerning the operation of the computer such that the computer is operated to perform one, more or all steps of the method.

The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating or determining steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term computer includes a server resource. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (VVWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing (medical) imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is a virtual reality device or an augmented reality device (also referred to as virtual reality glasses or augmented reality glasses) which can be used as "goggles" for navigating. A specific example of such augmented reality glasses is Google Glass (a trademark of Google, Inc.). An augmented reality device or a virtual reality device can be used both to input information into the computer by user interaction and to display information outputted by the computer. Another example of a display device would be a standard computer monitor comprising for example a liquid crystal display operatively coupled to the computer for receiving display control data from the computer for generating signals used to display image information content on the display device. A specific embodiment of such a computer monitor is a digital lightbox. An example of such a digital lightbox is Buzz®, a product of Brainlab AG. The monitor may also be the monitor of a portable, for example handheld, device such as a smart phone or personal digital assistant or digital media player.

The invention also relates to a computer program comprising instructions which, when on the program is executed by a computer, cause the computer to carry out the method or methods, for example, the steps of the method or methods, described herein and/or to a computer-readable storage medium (for example, a non-transitory computer-readable storage medium) on which the program is stored and/or to a computer comprising said program storage medium and/or to a (physical, for example electrical, for example technically generated) signal wave, for example a digital signal wave, such as an electromagnetic carrier wave carrying information which represents the program, for example the aforementioned program, which for example comprises code means which are adapted to perform any or all of the method steps described herein. The signal wave is in one example a data carrier signal carrying the aforementioned computer program. The invention also relates to a computer comprising at least one processor and/or the aforementioned computer-readable storage medium and for example a memory, wherein the program is executed by the processor.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, for example computer-readable data storage medium comprising computer-usable, for example computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, for example a data processing device comprising a digital processor (central processing unit or CPU) which executes the computer program elements, and optionally a volatile memory (for example a random access memory or RAM) for storing data used for and/or produced by executing the computer program elements. Within the framework of the present invention, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can for example include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). For the purpose of this document, a computer is a technical computer which for example comprises technical, for example tangible components, for example mechanical and/or electronic components. Any device mentioned as such in this document is a technical and for example tangible device.

The expression "acquiring data" for example encompasses (within the framework of a computer implemented method) the scenario in which the data are determined by the computer implemented method or program. Determining data for example encompasses measuring physical quantities and transforming the measured values into data, for example digital data, and/or computing (and e.g. outputting) the data by means of a computer and for example within the framework of the method in accordance with the invention. A step of "determining" as described herein for example comprises or consists of issuing a command to perform the determination described herein. For example, the step comprises or consists of issuing a command to cause a computer, for example a remote computer, for example a remote server, for example in the cloud, to perform the determination. Alternatively or additionally, a step of "determination" as described herein for example comprises or consists of receiving the data resulting from the determination described herein, for example receiving the resulting data from the remote computer, for example from that remote computer which has been caused to perform the determination. The meaning of "acquiring data" also for example encompasses the scenario in which the data are received or retrieved by (e.g. input to) the computer implemented method or program, for example from another program, a previous method step or a data storage medium, for example for further processing by the computer implemented method or program. Generation of the data to be acquired may but need not be part of the method in accordance with the invention. The expression "acquiring data" can therefore also for example mean waiting to receive data and/or receiving the data. The received data can for example be inputted via an interface. The expression "acquiring data" can also mean that the computer implemented method or program performs steps in order to (actively) receive or retrieve the data from a data source, for instance a data storage medium (such as for example a ROM, RAM, database, hard drive, etc.), or via the interface (for instance, from another computer or a network). The data acquired by the disclosed method or device, respectively, may be acquired from a database located in a data storage device which is operably to a computer for data transfer between the database and the computer, for example from the database to the computer. The computer acquires the data for use as an input for steps of determining data. The determined data can be output again to the same or another database to be stored for later use. The database or database used for implementing the disclosed method can be located on network data storage device or a network server (for example, a cloud data storage device or a cloud server) or a local data storage device (such as a mass storage device operably connected to at least one computer executing the disclosed method). The data can be made "ready for use" by performing an additional step before the acquiring step. In accordance with this additional step, the data are generated in order to be acquired. The data are for example detected or captured (for example by an analytical device). Alternatively or additionally, the data are inputted in accordance with the additional step, for instance via interfaces. The data generated can for example be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. In particular, the acquiring step does not involve an invasive step which would represent a substantial physical interference with the body, requiring professional medical expertise to be carried out and entailing a substantial health risk even when carried out with the required professional care and expertise. In particular, the step of acquiring data, for example determining data, does not involve a surgical step and in particular does not involve a step of treating a human or animal body using surgery or therapy. In order to distinguish the different data used by the present method, the data are denoted (i.e. referred to) as "XY data" and the like and are defined in terms of the information which they describe, which is then preferably referred to as "XY information" and the like.

BRIEF DESCRIPTION OF THE DRAWINGS

In the following, the invention is described with reference to the appended figures which give background explanations and represent specific embodiments of the invention. The scope of the invention is however not limited to the specific features disclosed in the context of the figures, wherein.

DESCRIPTION OF EMBODIMENTS

Figure 1:
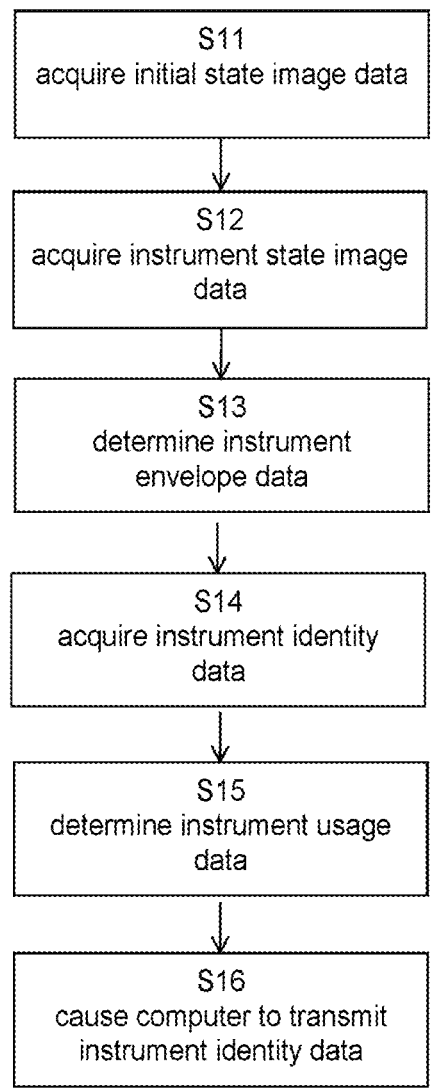
FIG. 1 illustrates the basic flow of the method according to the first aspect.

FIG. 1 illustrates the basic steps of the method according to the first aspect, in which step S11 encompasses acquisition of the initial state image data, step S12 encompasses acquisition of the instrument state image data and subsequent step S13 encompasses determination of the instrument envelope data. Then, step S14 continues with acquisition of the instrument identity data. Step S15 is directed to determining the instrument usage data, and step S16 to the transmission of the instrument identity data to a further computer.

Figure 2:
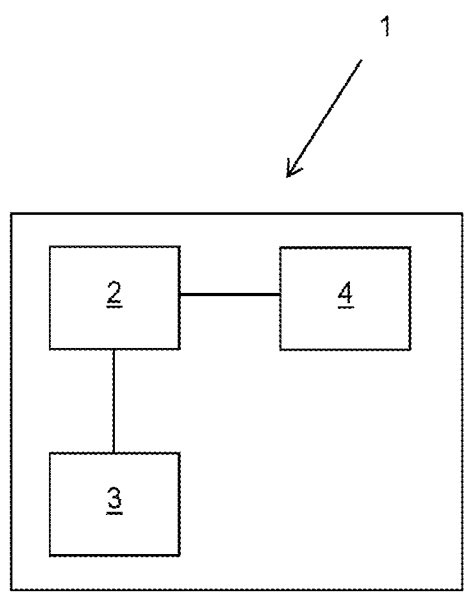
FIG. 2 is a schematic illustration of the system according to the fifth aspect.

FIG. 2 is a schematic illustration of the medical system 1 according to the fifth aspect. The system is in its entirety identified by reference sign 1 and comprises a computer 2, a camera 3 for generating the initial state image data and the instrument state image data and a medical computing system 4 comprising a further computer. The components of the medical system 1 have the functionalities and properties explained above with regard to the fifth aspect of this disclosure.

In one example, the disclosed method encompasses a labelling process during setup of the instrument tray by operation room technicians.

This labelling process can be used for verification that the necessary instrument is present by comparing to a list of instruments during the later workflow.

The idea is to identify an instrument that is picked up from the instrument tray not by their shape or their marker (such as their envelope), but by their position inside the instrument tray.

Once the position-identity relation is established, the shape or marker can be stored and later used during the same procedure, once the instrument is put somewhere else in the instrument tray.

The relation between the position and the instrument can be obtained by either
- A manual labelling during the setup (filling) of the instrument tray: the user identifies the instruments optically or they are identified using markers; optional: the user verifies during this manual step, that all instruments are present.
- By using a standard setup from a database for the type of surgery. In that database, the type of surgery, the instrument and the position in the instrument tray is stored.
- The relation is stored by assigning a two-dimensional position or area relative to the tray coordinates to an instrument type.

An optical camera is provided above the instrument tray. When by image analysis it is found that an instrument is taken out from a position/area of interest, the identity of the instrument is known and can be transferred to the tracking and display system, e.g. for more accurate tracking because the shape of the instrument is known or for more accurate augmentation or visualization of the correct instrument. The type used can also be stored for reporting or can be used for identifying errors.

The method can be outlined as follows:
Define position and identification data in tray [teach in]
When instrument is picked up, measure position (x,y) and identify instrument [tracking]
Use instrument identity e.g. for tracking the tip of the instrument, e.g. when the tip position is calculated from a marker position using the exact geometry of the instrument, visualization of the instrument, e.g. when the way the instrument is displayed depends on the identity, augmentation, e.g. when the information displayed in an augmented reality device depends on the type of instrument, e.g. a drill diameter, a warning, e.g. when the type of instrument doesn't fit to the type of procedure, reporting of the type of instruments used, plausibility check, e.g. if the combination of different instruments can be used in a surgery, e.g. a drill bit and a drill, e.g. a power drill.

Optional variations of the method are:
When instrument is put back in, identify risk of accidental exchange, e.g. provide guidance where to put it or give a warning if it was misplaced.
Store instrument shape or other instrument identifiers once it is used, so it can be identified by the shape or identifier during the next use.
Trigger re-teach if necessary, e.g. if the user misplaces it or if the identification doesn't match the database entry.
Give augmented reality guidance during instrument tray setup from predefined database of position/identity relations
Store preferred instrument tray setups per indication and/or user; then augmented guiding for instrument tray setup can be provided
Ask user for confirmation that the right instrument is present during teach in.

The invention claimed is:

1. A computer-implemented method of transmitting identification information of an instrument to be used in a procedure, the method comprising:
   acquiring initial state image data by a computer from an associated camera operatively coupled with the computer, the initial image data being representative of an image of an instrument tray in an initial state free of any instruments disposed thereon;
   acquiring instrument state image data by the computer from the associated camera, the instrument state image data being representative of an image of the instrument tray with an instrument being disposed at an initial location on the instrument tray;
   determining instrument envelope data based on the initial state image data and the instrument state image data, wherein the instrument envelope data describes a position of an envelope around the image representation of the instrument in the instrument state image data relative to a position of the instrument tray;
   determining instrument position data based on the instrument envelope data, wherein the instrument position data is representative of a position of the instrument disposed at the initial location on the instrument tray;
   acquiring instrument identity data based on a type of the procedure and on the position of the instrument disposed at the initial location on the instrument tray, wherein the instrument identity data identifies the instrument;
   assigning the acquired instrument identity data to the instrument envelope;
   determining instrument usage data based on the instrument envelope data, wherein the instrument usage data describes that the envelope around the image representation of the instrument has attained a predetermined spaced apart position relative to the position of the instrument tray; and based on determining the instrument usage data, transmitting by the computer the acquired instrument identity data assigned to the instrument envelope data to a further associated computer of an associated computing system.

2. The method according to claim 1, wherein:
the acquiring the initial state image data and the instrument state image data comprises acquiring the initial state image data and the instrument state image data by the computer from the associated camera configured to image the instrument tray in the initial state free of any instruments disposed thereon and the instrument being located on the instrument tray in an infrared wavelength range.

3. The method according to claim 1, wherein the determining the instrument envelope data comprises determining a difference between the image of the instrument tray in the initial state free of any instruments disposed thereon and the image of the instrument being located on the instrument tray.

4. The method according to claim 1, further comprising tracking a position of the instrument.

5. The method according to claim 1, wherein the determining the instrument envelope data comprises determining instrument envelope data that describes a generic bounding shape that is independent of a physical shape of the instrument.

6. The method according to claim 5, wherein the determining the instrument envelope data comprises determining instrument envelope data that describes an envelope having a predetermined distance around a circumference of the image representation of the instrument.

7. The method according to claim 1, further comprising:
extracting from the instrument envelope data an image signature of the instrument comprising an aspect ratio of an envelope around the image representation of the instrument.

8. The method according to claim 7, wherein the determining the instrument identity data comprises determining the instrument identity data based on the image signature.

9. The method according to claim 1, further comprising acquiring infrared image data that describes an infrared image comprising an image representation of the instrument tray.

10. The method according to claim 1, wherein the acquiring the instrument state image data comprises acquiring an image representation of an optical code disposed on the instrument, wherein the optical code comprises information content, and wherein the instrument identity data is determined further based on the information content of the optical code.

11. The method according to claim 1, wherein:
the acquiring the instrument identity data comprises labelling the instrument by receiving via a user interface an instruction from the user that assigns a name or other identifier to the image representation of the instrument in the instrument state.

12. The method according to claim 1, wherein the acquiring the instrument identity data that identifies the instrument comprises:
determining the instrument identity data based upon:
the instrument being disposed at the initial location on the instrument tray; and
database data that relates, based upon the type of the procedure, the predetermined positions or areas of the instrument tray with types of instruments expected to be disposed at the respective positions of the instrument tray or in the respective areas of the instrument tray.

13. The method according to claim 1, further comprising:
determining whether a correct instrument has been taken from the instrument tray by comparison of the determined instrument identity data with medical procedure planning data of the database data corresponding to the procedure.

14. A non-transitory computer readable storage medium storing a computer program comprising instructions that, when executed by a processor device of an associated computer, cause the associated computer to perform a method of transmitting identification information of an instrument to be used in a procedure, the method comprising:
acquiring initial state image data by a computer from an associated camera operatively coupled with the computer, the initial image data being representative of an image of an instrument tray in an initial state free of any instruments disposed thereon;
acquiring instrument state image data by the computer from the associated camera, the instrument state image data being representative of an image of the instrument tray with an instrument being disposed at an initial location on the instrument tray;
determining instrument envelope data based on the initial state image data and the instrument state image data, wherein the instrument envelope data describes a position of an envelope around the image representation of the instrument in the instrument state image data relative to a position of the instrument tray;
determining instrument position data based on the instrument envelope data, wherein the instrument position data is representative of a position of the instrument disposed at the initial location on the instrument tray;
acquiring instrument identity data based on a type of the procedure and on the position of the instrument disposed at the initial location on the instrument tray, wherein the instrument identity data that identifies the instrument;
assigning the acquired instrument identity data to the instrument envelope;
determining instrument usage data based on the instrument envelope data, wherein the instrument usage data describes that the envelope around the image representation of the instrument has attained a predetermined spaced apart position relative to the position of the instrument tray; and
based on determining the instrument usage data, transmitting by the computer the acquired instrument identity data assigned to the instrument envelope data to a further associated computer of an associated computing system.

15. The non-transitory computer readable storage medium according to claim 14, wherein:
the acquiring the instrument identity data comprises labelling the instrument by receiving via a user interface an instruction from the user that assigns a name or other identifier to the image representation of the instrument in the instrument state.

16. The non-transitory computer readable storage medium according to claim 14 that, when executed by the processor device of the associated computer, causes the associated computer to:
 determine the instrument identity data based upon:
  the instrument being disposed at the initial location on the instrument tray; and
  database data that relates, based upon the type of the procedure, the predetermined positions or areas of the instrument tray with types of instruments expected to be disposed at the respective positions of the instrument tray or in the respective areas of the instrument tray.

17. The non-transitory computer readable storage medium according to claim 14 that, when executed by the processor device of the associated computer, causes the associated computer to:
 determine whether a correct instrument has been taken from the instrument tray by comparison of the determined instrument identity data with medical procedure planning data of the database data corresponding to the procedure.

18. A system comprising:
 a computer comprising a processor, a storage medium device operatively coupled with the processor, and a computer program stored in the storage medium device; and
 a camera operably coupled with the computer and being operable for generating initial state image data representative of an image of an instrument tray in an initial state free of any instruments disposed thereon and instrument state image representative of an image of an instrument to be used in a procedure and the instrument tray with the instrument being located on the instrument tray, wherein the processor is operable to execute the computer program to perform a method comprising:
  acquiring the initial state image data by the camera, wherein the initial image data is representative of an image of an instrument tray in an initial state free of any instruments disposed thereon;
  acquiring the instrument state image data by the camera, wherein the instrument state image data is representative of an image of the instrument tray with an instrument being disposed at an initial location on the instrument tray;
  determining instrument envelope data based on the initial state image data and the instrument state image data, wherein the instrument envelope data describes a position of an envelope around the image representation of the instrument in the instrument state image data relative to a position of the instrument tray;
  determining instrument position data based on the instrument envelope data, wherein the instrument position data is representative of a position of the instrument disposed at the initial location on the instrument tray;
  acquiring instrument identity data based on a type of the procedure and on the position of the instrument disposed at the initial location on the instrument tray, wherein the instrument identity data identifies the instrument and
  assigning the acquired instrument identity data to the instrument envelope;
  determining instrument usage data based on the instrument envelope data, wherein the instrument usage data describes that the envelope around the image representation of the instrument has attained a predetermined spaced apart position relative to the position of the instrument tray; and
  based on determining the instrument usage data, transmitting by the computer the acquired instrument identity data assigned to the instrument envelope data to a further associated computer of an associated computing system.

19. The system according to claim 18, wherein:
the acquiring the instrument identity data comprises labelling the instrument by receiving via a user interface an instruction from the user that assigns a name or other identifier to the image representation of the instrument in the instrument state.

20. The system according to claim 18:
wherein the acquiring the instrument identity data that identifies the instrument comprises:
 determining the instrument identity data based upon:
  the instrument being disposed at the initial location on the instrument tray; and
  database data that relates, based upon the type of the procedure, the predetermined positions or areas of the instrument tray with types of instruments expected to be disposed at the respective positions of the instrument tray or in the respective areas of the instrument tray; and
further comprising determining whether a correct instrument has been taken from the instrument tray by comparison of the determined instrument identity data with medical procedure planning data of the database data corresponding to the procedure.

* * * * *